United States Patent [19]

Intrator et al.

[11] 3,781,978

[45] Jan. 1, 1974

[54] PROCESS OF MAKING THERMOELECTROSTATIC BONDED SEMICONDUCTOR DEVICES

[75] Inventors: Alexander M. Intrator, Dewitt; Norbert Adams, Syracuse, both of N.Y.

[73] Assignee: General Electric Company, Syracuse, N.Y.

[22] Filed: May 16, 1972

[21] Appl. No.: 253,879

[52] U.S. Cl. .................. 29/589, 29/471.9, 29/472.9, 219/10.53

[51] Int. Cl. ......... B01j 17/00, H01l 7/02, H01l 7/16

[58] Field of Search ........................ 29/472.9, 497.5, 29/589, 471.9; 219/10.53; 156/272; 204/16

[56] References Cited

UNITED STATES PATENTS

| | | | |
|---|---|---|---|
| 3,256,598 | 6/1966 | Kromer et al. | 29/498 X |
| 3,397,278 | 8/1968 | Pomerantz | 156/272 X |
| 3,417,459 | 12/1968 | Pomerantz et al. | 20/472.9 |
| 3,506,424 | 4/1970 | Pomerantz | 156/272 X |
| 3,537,175 | 11/1970 | Clair et al. | 29/589 X |
| 3,589,965 | 6/1971 | Wallis et al. | 156/272 |
| R27,287 | 2/1972 | Lepselter | 29/589 X |

*Primary Examiner*—Robert D. Baldwin
*Assistant Examiner*—Ronald J. Shore
*Attorney*—Robert J. Mooney et al.

[57] ABSTRACT

Semiconductor devices are provided in which a vitreous support member such as translucent glass plate serves as a principal support member for the semiconductor body of the device. One or more metallized paths are provided on a face of the vitreous support member which serves as a sealing surface. A major face of the semiconductor body equipped with one or more conductive contacts are provided, if desired, with an insulative and passivating layer, through which the contacts are exposed, is situated in confronting contacting relation with the vitreous support member and so arranged that the semiconductor body contacts register with the metallized paths on the vitreous support member. The vitreous support member and semiconductor body are permanently united by a thermoelectrostatic bond formed by heating to a temperature in the range of about 300-450° C and application of an electrostatic field of about 200-500 volts d.c. and a magnetic field having a flux density of about 3,000 to 20,000 gauss, such thermo-electrostatic bond also permanently uniting the metallized paths to the support member and to the semiconductor body, as well as permanently uniting the contacts on the semiconductor body to the metallized paths.

1 Claim, 9 Drawing Figures

PATENTED JAN 1 1974

3,781,978

PROCESS OF MAKING THERMOELECTROSTATIC BONDED SEMICONDUCTOR DEVICES

The present invention relates to improvements in semiconductor devices such as diodes, transistors, thyristors, and the like having insulatively supported or encapsulated bodies of semiconductor material, and to improved methods and apparatus for the manufacture of such products. More particularly, the invention relates to improvements in packaging the semiconductor bodies of such devices, that is in providing the attached leads and associated structure by which mechanical support is provided to such semiconductor bodies, heat is extracted from them, and conductive connections are provided to them.

In accordance with a principal feature of the present invention, the semiconductor body of a diode, transistor, thyristor, or the like, after the formation therein of the various regions defining PN junctions, if any, and desired electrical characteristics, and after application thereto of the various requisite metallic contacts, is thermo-electrostatically bonded to a vitreous support such as a glass plate. On the glass plate is provided, prior to the attachment of the semiconductor body thereto, a pattern of metallization which ultimately serves to constitute a set of electrical leads for the semiconductor body. Desirably the semiconductor body is bonded to the glass substrate with its contact-equipped surface facing down, i.e. confronting the glass, so that the individual metallic contacts on the semiconductor body are in registry with the inner ends of the leads constituted by the metallization pattern on the glass.

One of the features which makes semiconductor devices assembled according to our invention particularly advantageous from both a mechanical and an electrical standpoint is the nature, quality, and ease of formation of the bonds which unite the semiconductor body to the vitreous substrate and unite the various metallized regions to the semiconductor body and to the vitreous substrate. In a preferred embodiment of our invention, such bonds are formed by a novel magnetic-field enhanced thermo-electrostatic bonding process described and claimed in U.S. Pat. application Ser. No. 217,117, filed Jan. 12, 1972, in the names of N. Adams and E. A. Baum as inventors, and assigned to the assignee of the present invention.

In the Adams and Baum application Ser. No. 217,117, a process is disclosed for uniting one or more vitreous insulative members with one or more metallic conductive members or a combination of metallic members and bodies of semiconductor material. Such members are united by the application of heat and a magnetic field and an electrostatic field. The magnetic field has flux lines extending in the plane of the surfaces to be united and has an intensity of about 3,000 to 20,000 gauss, while the heating is sufficient to bring the surfaces to be united up to a temperature of about 300-450°C, and the electrostatic field has an intensity of, for example, 200 to 500 volts and is applied by placing a pair of electrodes, one of which is preferably a probe of minute contact area, in contact with the elements to be united. The present invention is based in part upon the discovery that by the use of the bonding process described in co-pending application Ser. No. 217,117, in association with certain unique packaging structural features, a variety of novel semiconductor devices can be provided which have unexpectedly attractive advantages in terms of ease of assembly, manufacturing cost, ruggedness, desirably small size, and electrical performance.

Accordingly, a principal object of the present invention is to provide a family of improved semiconductor devices each having a body of semiconductor material bonded to a vitreous support member, which support member also provides a supporting substrate for external leads bonded to the vitreous support member and to the semiconductor body.

Another object is to provide an improved semiconductor device in which the contact-equipped face of the semiconductor body thereof is tenaciously and permanently bonded to a vitreous overlying support member, such bonds being formed at temperatures below 500°C avoiding deleterious effects on the semiconductor body.

Another object is to provide semiconductor devices of the foregoing character which are easy to assemble at low cost with a minimum of direct labor.

These and other objects of the invention will be apparent from the following description and accompanying drawings wherein.

Figure 1:
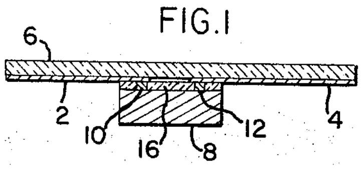
FIG. 1 is a sectional view of one form of semiconductor device constructed in accordance with the present invention.

Turning to FIG. 1, the device there shown includes a thin layer of a suitable metal, such as aluminum, titanium, molybdenum, or a laminate of gold over molybdenum, configured in a selected appropriate pattern to establish selectively arranged electrically conductive paths 2,4, and provided on a supporting suitable electrically insulative vitreous member such as a thin plate of glass 6. The composition of the vitreous member 6 is not critical, and it may be made, for example, of any of a variety of commercially available inexpensive glasses such as the lead glasses, zinc borosilicate glasses, or the like. Vitreous member 6 may also consist of various vitreous ceramic materials such as aluminum oxide, forsterite, aluminum nitride, beryllium oxide, or the like. In applications where transparency of the vitreous member to a particular kind of radiation, such as visible light or infra red radiation, is desired this factor will, of course, affect the choice of material for the vitreous member 6. Usually, hereinafter the vitreous member 6 will be referred to for convenience simply as "glass."

The metallization 2,4, of the glass 6 may be accomplished in any of a variety of ways known to those skilled in the art, such as vapor deposition through a template in the form of a suitably apertured mask, metallization of the entire glass surface followed by selective etching to remove unwanted metal areas, or selective application of a conductive slurry or paste to the glass which is then fired in place in the selected areas corresponding to the desired pattern on conductive paths. The metallization may have a thickness of, for example, 0.01 to 1.00 mils, and the glass member a thickness of, for example, 5 to 500 mils.

According to the present invention, a semiconductor body 8 having one or more metallic electrical contacts 10, 12 on one major face is united with the appropriately metallized glass member so that the electrically conductive paths established by the patterned metallization on the glass provide leads connected to the metallic contacts on the semiconductor body. The semiconductor body may be of a compound semiconductor material such as gallium arsenide, or an elemental semiconductor material such as silicon or germanium. The semiconductor body may comprise a plurality of regions or portions separated by one or more PN junctions (not shown) and may be provided with selectively located areas of surface metallization forming the electrical contacts. Also selected areas of the contact-equipped surface of the semiconductor body may, in the fashion known to those skilled in the art, be covered with a very thin layer 16, i.e. several thousand Angstroms, of insulative material such as silicon oxide, silicon nitride, aluminum oxide, or mixtures of laminates thereof. Desirably the conductive paths 2,4 on the glass member 6 are so arranged that the inner ends of the respective conductive paths register with the contacts 10,12 on the semiconductor body 8. Thus when the semiconductor body 8 is united with the glass member 6 in accordance with the present invention the conductive paths 2,4 are automatically connected to the respective contacts 10,12 on the semiconductor body. Also the other glass-confronting areas of the semiconductor body 8, or the oxide or other insulative coating 16 thereon, are united to the glass 6 at the same time so that the entire glass-confronting surface of the semiconductor body 8 is effectively intimately bonded to the glass member 6, and is thereby permanently affixed to it and supported by it.

It is a particular feature of the present invention that the various advantages it provides in packaging semiconductor bodies are derived without requiring any special metallization or insulative coatings on the semiconductor body or any other special treatment or preparation of it. For example, the semiconductor body 8 may be monocrystalline silicon having PN junctions formed by diffusion in accordance with conventional processes, oxide coated as is conventional, and having its top surface contacts situated in apertures in the oxide and consisting of aluminum or other contact metallization heretofore known to those skilled in the art. Also, the contact metallization need not be provided with any special outstanding lands or bumps.

Figure 4:
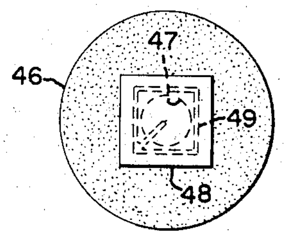
FIG. 4 is another alternative form of semiconductor device constructed in accordance with the present invention.
Figure 2:
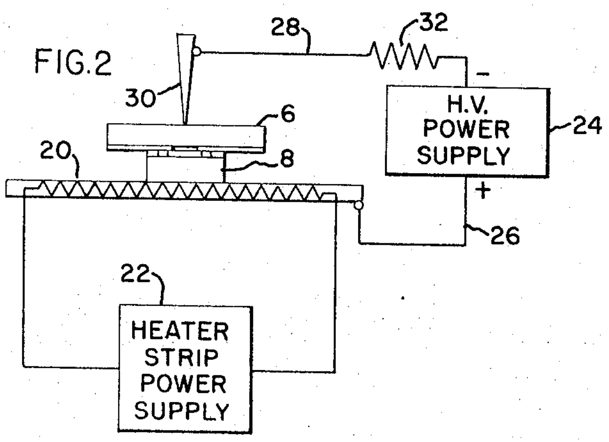
FIG. 2 is a schematic view of one form of apparatus for constructing the device of FIG. 1 in accordance with the present invention.

To bond the glass 6 to the semiconductor body 8 or its oxide coating 16, and to bond the metallization 2,4 on the glass to the contacts 10,12 on the semiconductor body 8, according to the present invention, the semiconductor body is placed on a heater 20, as shown in FIG. 2, with its contacts facing upward. The metallized glass member 6 is placed on the top of the semiconductor body 8 with the metallization constituting leads 2,4 in registry with the upwardly facing contacts 10,12. The heate 20, which may be a resistance heating element, for example, is energized by a suitable power supply 22 to bring the temperature of the glass and semiconductor body up to approximately 300°–450°C, and a magnetic field having an intensity of 3,000 to 20,000 gauss, whose flux lines extend parallel to the plane of the interface of the glass and semiconductor surfaces to be bonded, is provided. The magnetic field can be provided in a number of ways, such as by permanent magnets (not shown) closely adjacent to the sealing surfaces to be bonded, or, when the heater 20 is an electric resistance heater through which current is passed, by the utilization of the electromagnetic field from the heater current. An electrostatic field is then applied between the glass 6 and semiconductor body 8 by connecting the positive pole of a voltage source 24 through connector 26 and heater 20 to the back of the semiconductor body, i.e., its surface remote from the glass, and connecting the negative pole of the voltage source 24 through connector 28 to the surface of the glass remote from the semiconductor body. Preferably the contact to the glass is made by a metallic probe 30 of minute contact area, as shown in FIG. 4. If desired, a non-oxidizing cover gas may be flowed over the members to be bonded during the bonding process.

This bonding process produces a permanent intimate and tenacious bond between the glass member and the confronting face of the semiconductor body or its oxide coating, as well as between the glass metallization 2,4 and the glass itself and also between the glass metallization and the contacts 10,12 on the semiconductor body. These bonds are all formed in a time span of from a few seconds to about one minute in accordance with the foregoing process, the time varying inversely with the temperature to which the bodies are heated before the electrostatic field is applied. We have found that such bonds can be formed in only a few seconds when this temperature is between 400° and 450°C.

In one embodiment of apparatus used to produce bonds as above described, the heating elemnt 20 consisted of a strip of nichrome resistance heater material, approximately 2 inches long and a quarter inch wide and one-twentieth of an inch thick, through which from power supply 22 a 60 hertz heating current of approximately 9 to 100 amperes rms value was passed to produce the desired heating of the semiconductor body 8 and overlying glass member 6 on the heating element as shown in FIG. 2. The member 6 was about 6 mils thick, i.e., in a direction normal to the confronting face of the semiconductor body, and was about 40 mils wide and 50 mils long. Aluminum metallization 2,4 on the glass was about 10,000 to 20,000 Angstroms thick, applied by conventional vapor plating techniques. The semiconductor body 8 was a monocrystalline silicon pellet about 10 mils thick having a top surface of about 40 × 40 mils covered with an insulating passivating layer 16 of silicon dioxide having a thickness of about 8,000 – 15,000 Angstroms. The semiconductor body 8 included emitter, base and collector regions separated by emitter and collector PN junctions, and had, on its surface confronting the glass, emitter and base contacts of aluminum provided in apertures in the top oxide 16.

The aluminum contacts 10,12 were about 10,000 Angstroms thick and has been applied by conventional vapor plating techniques.

The heating was carried out in room air for a period of about 10 to 20 seconds sufficient to bring the bodies to be bonded up to a temperature of about 375°C, and during the heating period the magnetic field of about 3,000 to 20,000 gauss intensity and having flux lines extending substantially in the plane of the contacting sealing surfaces to be joined was provided by the passage of the heater current through the heating element 20. The positive terminal of the electrostatic potential supply was connected to the semiconductor body 8 bottom surface through the heating element 20, and the negative terminal of the electrostatic potential supply, of about 300 volts d.c., was connected through a limiter resistor 32 of about 3 megohms to the metallic probe 30 contacting the upper face of the glass plate 6, i.e., the face parallel to the glass sealing surface but spaced from the sealing surface by the 6 mil thickness of the glass. When the electrostatic field was thus applied, an ammeter (not shown) in series with the metallic probe 30 was observed to register a pulse of current of approximately 250 microamperes and 3 second duration. Simultaneously with this pulse of current the glass member 6 was observed to exhibit slight surface distortions, indicative of the glass sealing surface being slightly plastically deformed and drawin into intimate sealing contact with the confronting surface of the semiconductor body 8. Likewise, the metallization on the glass was observed to exhibit slight surface distortions indicative of its being drawn into intimate sealing contact with the glass. Thereupon the heating element was de-energized, the electrostatic probe removed, and the sealed members allowed to cool in room air to room temperature. Strong, intimate and substantially hermetic permanent bonds were thereby formed between the glass 6 and its metallization 2,4, between the glass and the semiconductor body 8 and its oxide coating 16, and between the metallization on the glass and the metal contacts 10,12 on the semiconductor body.

The reasons for the effectiveness of the sealing process above described, the short time involved, and the uniformly intimate and secure bonding of the parts joined by the sealing process, are not fully understood. However, it is believed that the magnetic field assists in causing a corona-type discharge of electrons to occur from the negative probe 30 to the glass surface in the vicinity of the high electrostatic field adjacent the probe tip. This is believed to neutralize positive ions in the member to be sealed, and in turn produce a strong electrostatic attraction field drawing the sealing surfaces of bodies 6 and 8 together.

Figure 3:
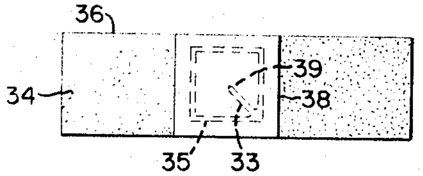
FIG. 3 is an alternate form of semiconductor device somewhat similar to that of FIG. 1.

FIG. 3 shows an assembly of semiconductor body 38 and metallization 34 on glass support 36 similar to that of FIG. 1, but wherein the face of the semiconductor body 38 confronting the glass has a single central conductive contact 39 connected by a radial conductive path 33 to an annular conductive path 35 on the oxide coating of the semiconductor body. This structure is suitable for applications in which the semiconductor body is intended to be responsive to radiation falling on it through the glass support member 36. FIG. 4 shows an alternative form of glass member 46 and semiconductor body sandwich wherein the glass support member 46 has a central opening 47 opposite the portion of the semiconductor body 48 within the annular conductive path 49 on body 48.

Figure 5:
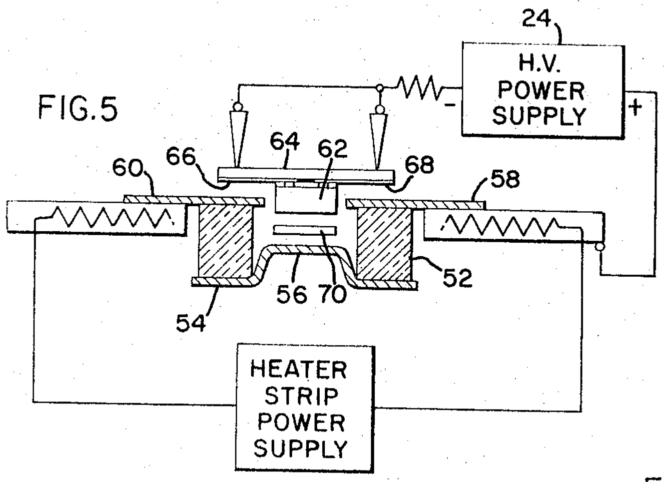
FIG. 5 is another illustrative embodiment of apparatus similar to that of FIG. 4 and showing yet another form of semiconductor device being assembled according to the invention.

Another embodiment of a semiconductor device having a package in accordance with the present invention is shown in FIG. 5. In the structure shown in FIG. 5 a housing for the semiconductor body is provided including an annular insulative member 52 having one end closed by a disc-shaped metal plate 54 having a reentrant central portion providing a platform 56. The other end of the insulative member is joined to an annular plate 58 having an outstanding flange 60. The semiconductor body 62 is bonded at its upper surface to a disc-shaped glass plate 4 by the bonding process above described, and two top contacts on the semiconductor body are likewise united to respective metallized paths 66,68 on the glass plate by the bonding process hereinbefore described. This subassembly of semiconductor body 62 and glass plate 64 is arranged within the housing, as shown, with those portions of the metallized paths 66,68 which extend radially outward of the semiconductor body serving to make electrical contact to the annular plate 58. The bottom major face of the semiconductor body contacts the platform through a preformed solder wafer 70 of, for example, gold, tin, silver, or a mixture thereof. The entire assembly of housing, semiconductor body and glass plate is then, as shown in FIG. 5, placed in a central aperture in a heater strip 72 otherwise similar to the heater 20 of FIG. 2, and bonded as heretofore described, with the result that the metallized portions 66,68 of the glass plate are united to the annular metal plate 58 and the bottom face of the semiconductor body is united to the platform through the solder wafer 70. The solder wafer 70, by fusing and wetting the bottom of the semiconductor body and the top of the platform 56, serves to accommodate any minor variations in spacing of these two members.

The completed semiconductor device resulting from the assembly shown in FIG. 5 is particularly suitable for applications in which the semiconductor body is intended to be responsive to incident radiation falling on it through the portion of the glass plate 64 bonded to it.

Figure 6:
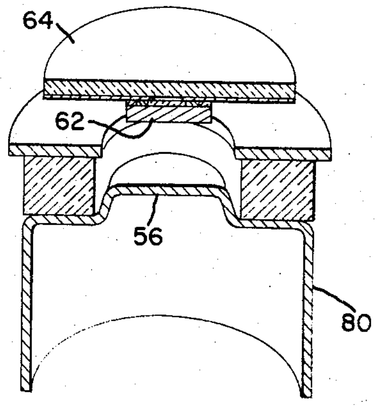
FIG. 6 shows another form of a partially assembled device somewhat similar to that of FIG. 5.

FIG. 6 shows a packaged semiconductor body 62 in the form of a completely assembled structure somewhat similar to that shown in process of assembly in FIG. 5, but wherein the lower metallic metal plate has a downwardly extending cylindrical flange 80.

Figure 7A:
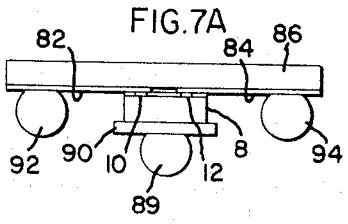
FIGS. 7A and 7B are plan and elevation fragmentary views of another form of semiconductor device constructed according to the present invention.
Figure 7B:
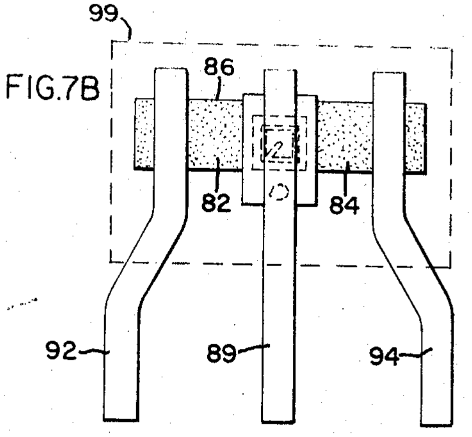

FIG. 7A and 7B show plan and elevation views of another embodiment of the invention in which the semiconductor body 8 is united to a glass plate 86 and metallization 82,84 on the glass plate serves as leads connected to contacts 10,12 on the semiconductor body, and wherein additional wire-like relatively stiff metal leads 92,94 are likewise bonded to the outer ends of the two respective metallization paths 82,84 on the glass and a third stiff wire-like lead 89 is similarly bonded to a metallic contact 90 on the face of the semiconductor body remote from the glass member. This latter structure is particularly suitable for encapsulation in a suitable plastic potting material, as shown in phantom outline at 99, from which the outer ends of the three stiff wire leads may project to serve as external connections for the device.

Figure 8:
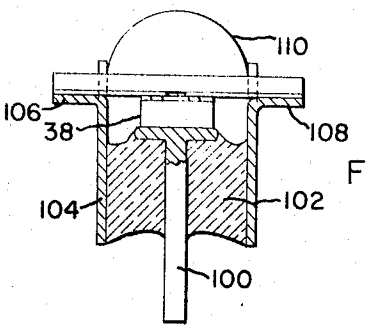
FIG. 8 is still another embodiment of a semiconductor device constructed in accordance with the present invention.

FIG. 8 shows still another alternative embodiment in which the semiconductor body 38 and metallized glass subassembly as shown in FIG. 3 is in turn bonded, by the bonding process heretofore described, to additional housing structure including a central nail-head-shaped lead 100, the top of which is connected to the bottom of the semiconductor body. The nail-head lead is supported by an insulative bushing 102 within a cylindrical metallic housing 104. The metallized leads on the glass are bonded to wings 106,108 integrally laterally extending from the housing member, by a bonding process such as above described. The structure of FIG. 8 likewise includes an essentially transparent plastic hemispherical lens cap 110 which fits over the portion of the glass member covering the semiconductor body, and through which incident radiation may pass to the semiconductor body, for example, to accommodate light activated operation thereof.

A particular advantage of semiconductor devices constructed according to our invention is that the packaging structure for the semiconductor body completely eliminates any flying leads or the need to make any thermal compression bonds. Thus a substantial amount of direct labor in the assembly of the package, previously concerned with making thermal compression bonds, is eliminated. Also the risk of flying leads becoming mangled or torn loose from their connection points is completely eliminated in structures made according to our invention. Of course, another very important advantage is that the bonds between the metallization on the glass and the glass and the semiconductor material are of exceptional tenacity, and are of a substantially hermetic quality. Thus an unusually rugged device of minute size and substantial strength can be made essentially automatically, with a minimum involvement of direct labor, since all of the critical connections are essentially formed in a single bonding process as herein described. Moreover, the bonding process described does not entail and unusually high temperatures such as to have a deleterious effect on any of the other parts of the finished product or the interior regions of the semiconductor body itself. The actual bonding process requires only a few seconds duration, and hence is particularly suitable for high volume mass production at low cost. The packaging techniques herein described are particularly suitable for application to semiconductor bodies which have been diffused and oxide masked, which have PN junctions and contact metallization formed by conventional planar processing techniques, and in which the contact metallization is aluminum rather than any more exotic or more expensive metals.

It will be appreciated by those skilled in the art that the invention may be carried out in various ways and may take various forms and embodiments other than the illustrative embodiments heretofore described. Accordingly, it is to be understood that the scope of the invention is not limited by the details of the foregoing description, but will be defined in the following claims.

What we claim as new and desire to secure by Letters Patent of the United States is:

1. In a process for making a semiconductor device the steps comprising forming a layer of metallization on at least a part of a sealing surface of a vitreous support member to constitute an electrical lead, placing in confronting contact with said sealing surface a face of a semiconductor body having a metallic contact so that said metallic contact is in registry with said lead on the support member, heating said support member and semiconductor body to a temperature of about 300° to 450°C, and applying an electrostatic field of about 200 to 500 volts d.c. between said heated support member and semiconductor body, with the negative side of said field at the support member and the positive side at the semiconductor body, while independently applying to said support member and body a magnetic field having flux lines extending generally in the plane of said contacting surfaces and having a flux density of about 3,000 to 20,000 gauss, said magnetic field assisting in the vicinity of the electrostatic field to bond the confronting faces of the semiconductor body and support member to permanently unite the contact to the lead and the lead to the support member and the semiconductor body to the support member.

* * * * *